July 9, 1963

M. L. GARRISON 3,096,984

SPREADER

Filed Sept. 29, 1960

INVENTOR.
MARVIN L. GARRISON

BY Cohn and Powell

ATTORNEY.

July 9, 1963  M. L. GARRISON  3,096,984
SPREADER

Filed Sept. 29, 1960  2 Sheets-Sheet 2

INVENTOR.
MARVIN L. GARRISON
BY Cohn and Powell
ATTORNEY.

3,096,984
SPREADER
Marvin L. Garrison, Seymour, Ind., assignor to Seymour Manufacturing Co., Seymour, Ind., a corporation of Delaware
Filed Sept. 29, 1960, Ser. No. 59,400
1 Claim. (Cl. 275—12)

This invention relates generally to improvements in a spreader, and more particularly to an improved portable device adapted to be operated while carried by the user.

An important object is realized by the provision of a shielded impeller in the spreader so as to protect the operator, to preclude damage to the impeller and to control distribution incident to spreading. A discharge slot of predetermined size is formed in the housing and placed in communication with the impeller chamber so that the impeller acts to distribute material out of the slot in a predetermined spread pattern.

Another important object is achieved by providing a spreader that is capable of distributing material such as seed, fertilizers, insecticides, weed killers and herbicides, all with equal facility. The structural arrangement of the shielded impeller and discharge slot assures that such material is thrown away from the operator in a selected direction and deposited on the ground in a predetermined area. This function keeps the material from touching the operator and thereby eliminates any possible health or sanitary hazard that might otherwise exist because of the personally objectionable or toxic character of some of these typical materials.

Still another important objective is afforded by the extension of the tubular housing of the spreader below the impeller chamber so as to provide a support stand adapted to seat on a subjacent surface such as the ground.

Yet other important objects are realized by constructing the spreader so that the hopper is placed in communication with the enclosed impeller chamber by a funnel to provide more efficient feeding action, by placing the drive mechanism in a separate compartment between the hopper funnel and impeller chamber to prevent obstruction by the material, and by providing a separate chamber in which the impeller is located, the chamber being effectively closed except for the lateral discharge slot to provide precise control of the direction and pattern of distribution.

Another important object is realized by providing means in a tubular housing which forms an enclosed impeller chamber, mounting an impeller in said chamber, providing means for feeding material from the hopper to the impeller chamber, and providing means for driving the impeller so that the impeller throws material outwardly through a lateral housing slot.

It is important to provide a spreader with a shielded opening and a closed bottom for the impeller chamber so that the flow of material is directed completely away from the operator and impelled in a restricted direction controllable by the operator. This feature is very important when spreading certain fertilizers, insecticides, herbicides, weed killers, etc., which would have a toxic effect upon the operator were an ample quantity of the material liberally thrown onto his person. Even though some materials may not be toxic, it is never desirable to have the clothing loaded with this kind of material, and therefore it is desirably avoided.

In the use of weed killer, the restricted opening is a necessity. Certain of the weed killers produced today are deadly in their effect upon all vegetation. It can be readily realized how important it is that if vegetation is to be treated with the weed killer that the weed killer be kept away from places not scheduled for treatment. Once applied, nothing will grow in the treated area so that the operator must direct his aim and be able to control it in the direction of that vegetation which he wishes to destroy. The present spreader solves this problem.

In the new spreader, the hopper is designed so as to funnel the material downward completely into the shutter exit. The smooth walls of the hopper, preferably constructed of a plastic, prevent any hanging-up of material on its way to the exit.

The use of plastic in the construction of the external housing in conducive to the use of bright decorative colors. Because of the contrast of such bright colors the unit is easily visible if it is set down in an open field.

One feature of the spreader, which is of particular importance when poisonous or deadly destroyers are used, is the ability of the operator to clean this unit completely after use. Because there is no canvas bag to absorb any of the material, the operator can first empty the unit of any powdery accumulation, and then completely clean the unit with water directed from a hose.

Other important advantages are provided by having the shape of the outer shell such that it fits comfortably onto the person operating it and because the rotating blades are completely enclosed, all chance of bodily harm by cutting has been eliminated.

It is an important object to provide a spreader that is simple and durable in construction, economical to manufacture, efficient in operation, and which can be readily operated by any one with little or no instruction.

The foregoing and numerous other objects and advantages of the invention will more clearly appear from the following detailed description of a preferred embodiment, particularly when considered in connection with the accompanying drawings, in which.

Figure 1:
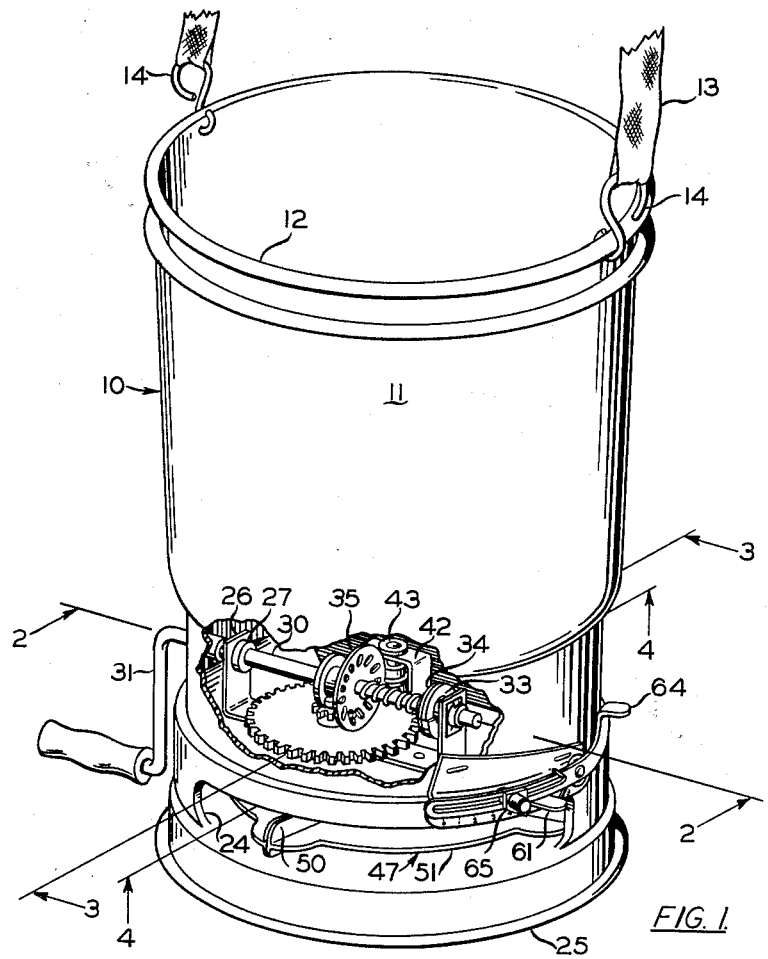
FIG. 1 is a perspective view of the spreader, partially cut away to show the drive mechanism.
Figure 2:
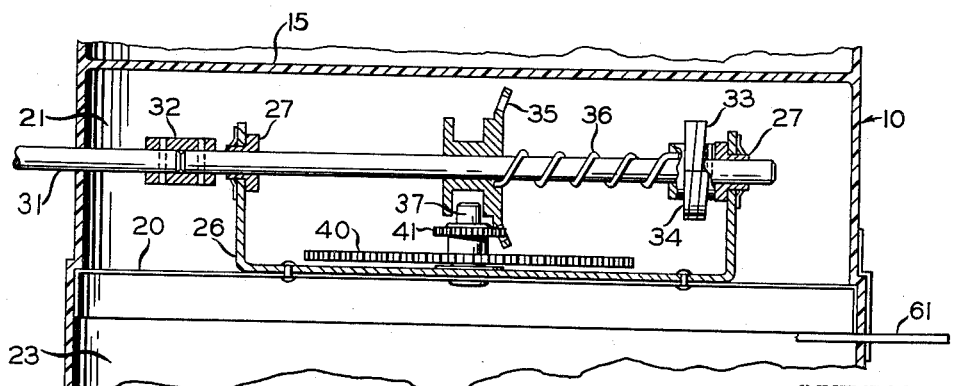
FIG. 2 is an enlarged, cross sectional view of the drive mechanism as seen along line 2—2 of FIG. 1.

Referring now by characters of reference to the drawings, and first to FIG. 1, it will be seen that the spreader includes a tubular, substantially cylindrical housing generally indicated at 10. In the preferred embodiment the housing 10 is constructed of durable plastic. The upper portion of housing 10 comprises a hopper 11 that is open at the top 12. A strap 13 is connected to the upper rim of hopper 11 by fasteners, 14, the strap 13 being adapted to fit over the shoulder of the user to carry the spreader. The material to be distributed is deposited into the hopper 11 through the open top 12.

Figure 3:
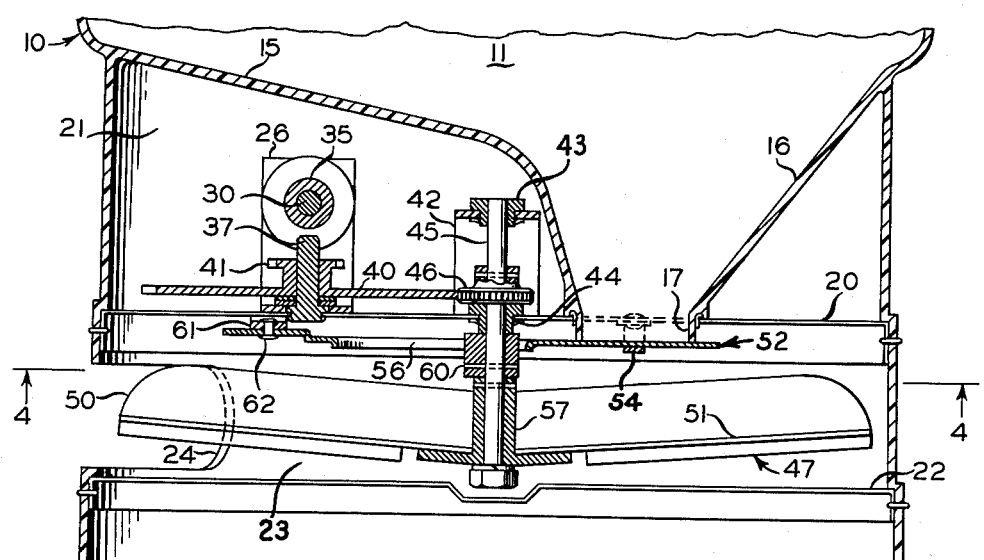
FIG. 3 is an enlarged cross sectional view of the bottom portion of the spreader as seen along line 3—3 of FIG. 1.

As is best seen in FIG. 3, a bottom wall 15 extends across the tubular housing 10 and forms the bottom of hopper 11. The bottom wall 15 is sloped and is provided with a downwardly convergent portion 16 that constitutes a funnel. A substantially rectangular discharge port 17 (FIGS. 3 and 4) is provided at the bottom of the funnel portion 16.

Extending across the tubular housing 10 and embracing the lower end of the funnel portion 16 is a wall 20. It is seen that the wall 20 is spaced from the sloping bottom wall 15 to provide a compartment 21 therebetween. The funnel portion 16 is offset to one side of the center axis of the tubular housing 10 to provide sufficient space for the location of the drive mechanism within the compartment 21.

Another wall 22 extends across the tubular housing 10 and is spaced below the wall 20 to provide a chamber 23 therebetween. The chamber 23 is laterally enclosed by the housing 10 except for an elongate discharge slot 24 extending partially around the housing periphery.

The wall 22 is spaced above the bottom end 25 of the housing 10 so that such end provides an edge support on which the spreader seats.

The drive assembly includes a U-shaped bracket 26 secured to the wall 20 and located within the compartment 21. Carried by the upstanding arms of bracket 26 are a pair of bearings 27, the bearing mounting a drive shaft 30. A crank 31 is drivingly attached to the shaft 30 by a coupling 32.

Drivingly attached to the shaft 30 immediately adjacent one bearing 27 is a clutch member 33. A coacting clutch member 34 is freely mounted on shaft 30 and is adapted to engage the clutch member 33.

Freely mounted on shaft 30 approximately midway between the upstanding arms of bracket 26 is a plate gear 35. A spring 36 is located above shaft 30, the spring 36 having one end attached to plate gear 35 and having the opposite end attached to the clutch member 34. The spring 36 tends to urge the clutch members 33 and 34 into frictional engagement.

Rotation of shaft 30 in one direction causes clutch member 33 to slip relative to clutch member 34, the clutch member 34 being axially depressed upon such camming engagement as permitted by the resilient loading of spring 36. On the other hand, rotation of shaft 30 in the opposite direction causes operative drive engagement of the clutch members 33 and 34, and hence causes operative rotation of plate gear 35 through the torsion connection of spring 36.

Fixed to wall 20 and extending upwardly into compartment 21 through the bracket 26 is a stub axle 37. Rotatively mounted on the stub axle 37 is a large spur gear 40 and a relatively small spur gear 41 integrally connected by a common hub. The smaller gear 41 intermeshes with the plate gear 35 and serves to rotate the larger gear 40.

An inverted U-shaped bracket 42 is fixed to the wall 20 and is located within compartment 21. Aligned bearings 43 and 44 rotatively mount a vertical impeller shaft 45. One of the bearings 43 is fixed to the U-shaped bracket 42 while the other bearing 44 is fixed to the wall 20. The impeller shaft 45 extends downwardly through the wall 20 and into the impeller chamber 23. Fixed to the impeller shaft 45 is a spur gear 46 that intermeshes with the relatively large gear 40. The gear 46 rests on top of the lowermost bearing 44 and serves to position the shaft 45.

Attached to the lower end of shaft 45 is an impeller 47 having a plurality of radially extending vanes 50 interconnected by a substantially flat horizontal plate 51. The impeller 47 is adapted to throw material laterally outward through the discharge slot 24.

A T-shaped shutter indicated at 52 is utilized to control the flow of material through the discharge port 17 onto the impeller 47. More particularly, the head 53 of shutter 52 normally closes the discharge port 17. A guide strap 54 slidably embraces the underside of the shutter head 53 and serves to hold the shutter tight against the lower end of the funnel portion 16.

Figure 4:
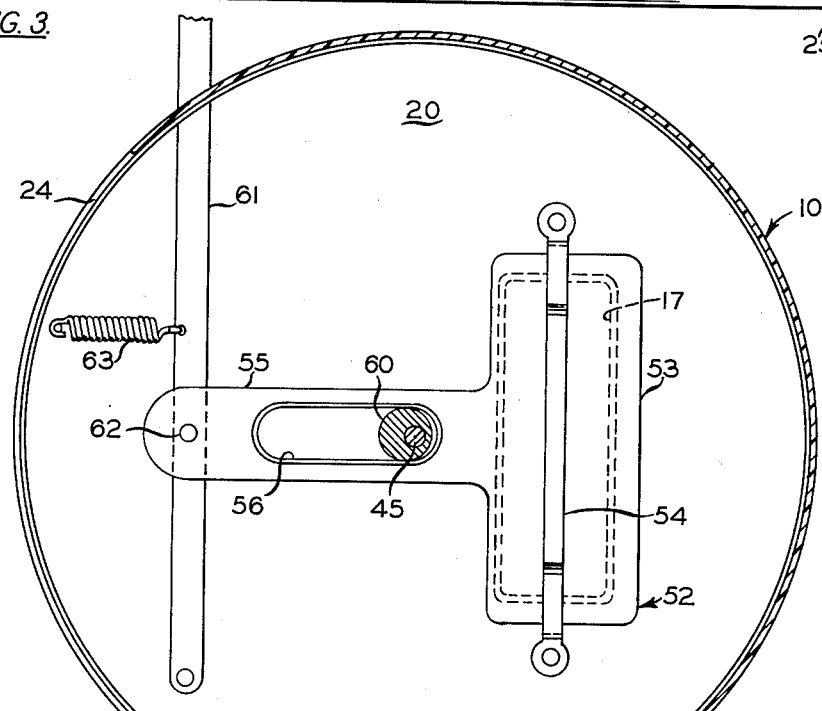
FIG. 4 is a view partially in cross section as seen along line 4—4 of FIG. 3.

The leg 55 of the T-shaped shutter 52 is provided with an elongate slot 56 through which the impeller shaft 45 extends. Drivingly attached to the impeller shaft 45 and located between the bearing 44 and hub 57 of the impeller 47 is an eccentric cam 60. As is best seen in FIGS. 3 and 4, the eccentric 60 is specifically located within the elongate slot 56 of shutter 52 and engages the side flanges defining such slot 56 to oscillate the shutter 52 upon rotation of the impeller shaft 45.

Pivotally attached to wall 20 is a control arm 61 that extends outwardly through the tubular housing 10. The leg 55 of the shutter 52 is pivotally attached by pin 62 to the control arm 61. A tension spring 63 attached to the control arm 61 tends to move the eccentric 60 relatively to one end of the shutter slot 56, and thereby tends to position the shutter head 56 so that it completely closes the discharge port 17.

The extent of the effective opening of discharge port 17 can be precisely regulated by the operator by gripping the control arm 61 and by moving it in a clockwise direction (FIG. 4) until the desired opening is obtained. The eccentric 60 will move relatively along the shutter slot 56 to permit such slidable adjustment of the shutter 52.

As is best seen in FIG. 1, a scale is provided on the exterior of housing 10 immediately adjacent the control arm 61. This scale indicates a particular opening for the discharge port 17. Pivotally attached to housing 10 is a lever 64 that overlaps and rests on the projecting portion of the control arm 61. An adjustable stop member 65 is attached to the lever 64 and is selectively positioned along the lever to determine a particular shutter opening.

For example, the stop member 65 is adjustably located along the lever 64 so that it indicates a particular position on the numeric scale. As the control arm 61 is moved rearwardly (FIG. 1), the arm 61 engages the stop member 65 and cams the lever 64 upwardly so as to permit the arm 61 to pass on the opposite side of the stop member 65. When this condition occurs, the lever 64 drops down, and the control arm 61 engages the stop member under loading of the spring 63, and is held in this position. Consequently, the shutter 52 opens the discharge port 17 a predetermined amount as indicated on the scale by stop member 65.

To close the discharge port 17, the lever 64 is merely pivoted by the operator so as to raise the stop member 65 above the control arm 61. As a result, the spring 63 tends automatically to urge the arm 61 forwardly to the position shown in FIG. 4 in which the shutter 52 closes the discharge port 17.

It is thought that the operation and functional advantages of the spreader have become apparent from the foregoing detailed description of parts, but for completeness of disclosure the use will be briefly described. It will be assumed that the discharge port 17 is closed by shutter 52 and that the lower support end 25 of the housing 10 is seated on a subjecent surface such as the ground.

First, the hopper 11 is filled with the material to be spread, this material is introduced into the hopper 11 through the open top end 12.

The operator then usually places the strap 13 over his shoulder and carries the spreader to the area to be treated. The lateral discharge slot 24 is directed away from the operator and directed toward such area.

First, the discharge port 17 is opened a predetermined amount by moving the control arm 61 rearwardly in the manner previously described. The stop member 65 engages the arm 61, and the lever 64 is cammed upwardly to permit movement of arm 61 to the opposite side of such stop member 65. Then, the lever 64 automatically drops downwardly onto arm 61 and the arm 61 engages the stop member 65 under loading of spring 63. The material in hopper 11 falls under gravity through the opening provided by shutter 52 and discharge port 17 and onto the impeller 47. The operator then walks along the area to be treated while simultaneously turning the crank 31.

As the crank 31 is turned in the operative direction, the drive shaft 30 is rotated and operates through the effective engagement of clutch members 33 and 34 to rotate the plate gear 35. Because of the intermeshing of gear 41 with plate gear 35, the gear 40 is rotated to drive the impeller gear 46. The ratios of the gears are selected so that there is a substantial, approximately 10 to 1, increase in speed. Thus, the impeller 47 is driven at a relatively high rate of speed.

The material falling through the shutter opening is deposited on the impeller plate 51 and is thrown out of the lateral discharge slot 24 by the impeller vanes 50. Because the operator can direct the discharge slot precisely, the distribution of the material can be accurately controlled. It will be importantly noted that the impeller 47 is completely shrouded in the chamber 23 except for the lateral discharge slot 24.

When the impeller shaft 45 is rotated, the eccentric 60 engages the shutter leg 55 and oscillates the shutter 52 about the pivot pin 62. This oscillating action of shutter 52 prevents the material from clogging the shutter opening and keeps the material in the immediate region of the discharge port 17 in an agitated condition. The guide strap 54 permits slidable longitudinal movement of the shutter 52, and at the same time permits the oscillating movement by eccentric 60.

When the operator stops turning the crank 31 but continues to hold it, the drive shaft 30 is held in a substantially stationary position. However, the momentum of impeller 47 operates through the gear drive to cause continued rotation of plate gear 35. As explained, the plate gear 35 is operatively connected to the clutch member 34 by the torsion spring 36. There is under these conditions a relative rotative movement of the clutch members 33 and 34 in a direction which permits slippage. The frictional engagement upon slipping of the clutch members 33 and 34 causes the impeller 47 to stop its rotation. The particular drive and clutch mechanism prevents any damage to the gears or bearings if rotation of the impeller is suddenly stopped, or in fact if the crank 31 is rotated in the opposite direction.

The shutter opening is then closed by merely pivoting the lever 64 to raise the stop member 65 above the control arm 61. The spring 63 acts automatically to pull the control arm 61 in a direction so that the shutter 52 closes the discharge port 17.

The operator can then set the spreader down by resting the bottom end 25 of the tubular housing 10 on the ground. The hopper 11 can then be refilled or if the spreading operation is completed any remaining material in the hopper 11 can be simply poured out and stored for future use. Because the tubular housing 10 is preferably constructed of a plastic, the hopper, as well as all other accessible portions of the spreader, can be quickly and easily washed by flushing with water.

Although the invention has been described by making detailed reference to a single preferred embodiment, such detail is to be understood in an instructive, rather than in any restrictive sense, many variants being possible within the scope of the claim hereunto appended.

I claim as my invention:

In a spreader, an elongate tubular housing open at the top, a first wall across the housing below the top to provide a hopper adapted to receive the material to be spread, said first wall having a downwardly convergent portion providing a funnel with a discharge port, a second imperforate wall completely across the housing adjacent the said discharge port to provide a lateral compartment between the housing and first wall and above said second wall, an impeller rotatively mounted on said second wall and disposed in said housing below said second wall, said impeller having a rotative vertical axis offset laterally from the discharge end of said funnel, drive means located in said compartment laterally adjacent said funnel above said second wall and connected to said impeller, said drive means being completely enclosed by said housing, first and second walls, and a third wall across said housing below said impeller, the said second wall, third wall and peripheral housing providing a shield and chamber for said impeller, the housing being provided with a lateral slot communicating with said chamber through which the impeller throws said material incident to spreading.

References Cited in the file of this patent

UNITED STATES PATENTS

| 502,604 | Bollinger | Aug. 1, 1893 |
| 579,049 | Eltzroth | Mar. 16, 1897 |
| 1,948,668 | Kuchler | Feb. 27, 1934 |
| 2,514,962 | McElhatton | July 11, 1950 |

FOREIGN PATENTS

| 18,395/29 | Australia | Feb. 14, 1929 |
| 185,450 | Germany | May 24, 1907 |
| 423,829 | Germany | Jan. 11, 1926 |